(12) United States Patent
Richards

(10) Patent No.: US 10,451,087 B2
(45) Date of Patent: Oct. 22, 2019

(54) ATTACHMENT ARRANGEMENT FOR TURBO COMPRESSOR

(71) Applicant: AERISTECH LIMITED, Warwickshire (GB)

(72) Inventor: Bryn Geoffrey Roddick Richards, Warwickshire (GB)

(73) Assignee: Aeristech Limited, Warwickshire (GB)

( * ) Notice: Subject to any disclaimer, the term of this patent is extended or adjusted under 35 U.S.C. 154(b) by 371 days.

(21) Appl. No.: 14/911,109

(22) PCT Filed: Aug. 8, 2014

(86) PCT No.: PCT/GB2014/052444
§ 371 (c)(1),
(2) Date: Feb. 9, 2016

(87) PCT Pub. No.: WO2015/019113
PCT Pub. Date: Feb. 12, 2015

(65) Prior Publication Data
US 2016/0195109 A1    Jul. 7, 2016

(30) Foreign Application Priority Data
Aug. 9, 2013 (GB) .................................. 1314270.8

(51) Int. Cl.
*F02B 33/44* (2006.01)
*F04D 29/62* (2006.01)
(Continued)

(52) U.S. Cl.
CPC .............. *F04D 29/626* (2013.01); *F01D 5/02* (2013.01); *F02B 33/40* (2013.01); *F02B 37/20* (2013.01);
(Continued)

(58) Field of Classification Search
CPC ........ F04D 29/626; F04D 29/685; F01D 5/02; F02B 39/10; F02B 37/10; F02B 37/16
(Continued)

(56) References Cited

U.S. PATENT DOCUMENTS 2,602,683 A    7/1952 Sulzer
3,041,848 A    7/1962 Greenwald
(Continued)

FOREIGN PATENT DOCUMENTS

DE            1199545 B     8/1965
DE    102007017777 A1 * 10/2008 .............. F02B 37/10
(Continued)

OTHER PUBLICATIONS

Machine generated translation of DE102007017777A1 (Year: 2008).*
International Search Report issued by the ISA/EP in connection with PCT/GB2014/052444 dated Oct. 23, 2014.

*Primary Examiner* — Ngoc T Nguyen
(74) *Attorney, Agent, or Firm* — Levenfeld Pearlstein, LLC

(57) ABSTRACT

A turbo-compressor comprises a compressor wheel having an attachment arrangement for attaching the wheel to a drive shaft. The attachment arrangement includes an axially extending spigot internally radially located in a bore in the drive shaft and secured to the drive shaft by fastening means into the rear of the compressor wheel. Thus the compressor wheel expands and tightens into the shaft at speed. Furthermore, the nose of the compressor wheel is free to accept an aerodynamic profile.

13 Claims, 7 Drawing Sheets

(51) Int. Cl.
*F04D 29/26* (2006.01)
*F01D 5/02* (2006.01)
*F02B 33/40* (2006.01)
*F02B 37/20* (2006.01)
*F04D 17/10* (2006.01)
*F04D 25/04* (2006.01)
*F04D 25/06* (2006.01)
*F04D 27/02* (2006.01)
*F04D 29/053* (2006.01)
*F04D 29/28* (2006.01)
*F04D 29/42* (2006.01)
*F04D 29/44* (2006.01)
*F04D 29/68* (2006.01)

(52) U.S. Cl.
CPC ............ *F04D 17/10* (2013.01); *F04D 25/045* (2013.01); *F04D 25/06* (2013.01); *F04D 27/0238* (2013.01); *F04D 27/0246* (2013.01); *F04D 29/053* (2013.01); *F04D 29/266* (2013.01); *F04D 29/284* (2013.01); *F04D 29/4213* (2013.01); *F04D 29/4226* (2013.01); *F04D 29/441* (2013.01); *F04D 29/685* (2013.01); *F05D 2220/40* (2013.01); *Y02T 10/144* (2013.01)

(58) Field of Classification Search
USPC .................................................. 60/611, 605.2
See application file for complete search history.

(56) References Cited

U.S. PATENT DOCUMENTS

| | | | |
|---|---|---|---|
| 4,340,317 A | | 7/1982 | Northern |
| 4,986,733 A | * | 1/1991 | Fleury ................... F01D 5/025 403/361 |
| 7,748,960 B1 | | 7/2010 | Marussich et al. |
| 2007/0034195 A1 | * | 2/2007 | Wijk ...................... F02B 33/34 123/565 |
| 2007/0271920 A1 | * | 11/2007 | Marsal ................... F02M 26/06 60/605.2 |
| 2012/0180478 A1 | * | 7/2012 | Johnson ................... F02D 9/02 60/605.2 |
| 2013/0152582 A1 | * | 6/2013 | Anschel ................. F01D 9/026 60/605.2 |

FOREIGN PATENT DOCUMENTS

| | | | | |
|---|---|---|---|---|
| DE | 102007028346 | A1 | 12/2008 | |
| EP | 2860402 | A1 | 4/2015 | |
| EP | 3030791 | A1 | 6/2016 | |
| GB | 1304763.4 | A | 1/1973 | |
| JP | H0557450 | U | 7/1993 | |
| JP | H09310699 | A | 12/1997 | |
| WO | 2005121559 | A1 | 12/2005 | |
| WO | 2012115086 | A1 | 8/2012 | |
| WO | 2014140529 | A1 | 9/2014 | |
| WO | WO-2014181119 | A1 * | 11/2014 | ......... F04D 29/4213 |

* cited by examiner

ATTACHMENT ARRANGEMENT FOR TURBO COMPRESSOR

TECHNICAL FIELD

The present invention relates to aerodynamic measures for enhancing operation of compressors, particularly turbo-compressors.

BACKGROUND

Turbo-compressors are devices that employ a rotational drive to blades to compress a fluid (typically a gas, such as air). Examples include centrifugal compressors, in which the blades are part of an impeller, although the principles described herein may be applied other types of turbo-compressor as well. One common use of turbo-compressors is in turbochargers. Strict limits imposed by legislative bodies are setting great challenges for engineers across the industry to develop greener means of vehicle propulsion. In order to cut down carbon dioxide emissions and address legislative limits, engine downsizing and turbocharging methods are trendsetting technologies that tackle these challenges and maintain engine performance. Engine downsizing involves reducing the swept volume of the engine, which compromises the performance of the engine, while forced induction boosting methods are adopted to satisfy driveability requirements.

The single-stage turbocharger is one of the typical boosting configurations adopted for a heavily downsized engine to ensure driveability requirements are met. However, the single-stage turbocharger is limited by the compressor flow range. This limitation produces a poor low-end engine torque response. Often, engine designers limit the pressure they specify from the turbocharger and therefore the degree of engine downsizing in order to achieve an acceptable low-end engine torque response. The poor low-end torque response arises because the compressor flow range is restricted by its choke and surge limits. The choke flow of the impeller is where the relative fluid Mach number in the impeller is equal to one—i.e. the relative flow speed reaches the speed of sound. This occurs at higher mass flow rates. At lower mass-flow rates, the flow is subjected to fluid separation and flow reversal. This causes the compressor to stall and surge. Surge results in a reduction in compressor efficiency and a drop in pressure ratio, which damages the mechanical integrity of the compressor and shortens compressor life.

Various measures are being taken by engineers to design compressors that suppress surge. These solutions try to tackle surge and allow stable compressor flow operation across a wider flow range. One commonly used method known as Self-Recirculating Casing Treatment (SRCT) relies on the dynamics of the flow to recirculate mass back into the compressor inlet. The different types of SRCT optimisation methods can be broken down into three main elements: slot location, symmetric, and asymmetric. Slot location looks at adjusting the location of the slots for the recirculation path and optimising it to enhance the surge characteristics of the compressor. SRCT optimisation is also investigated by looking at the channel shape of the recirculating air flow path—i.e. symmetric and asymmetric channel shapes. Examples of these SRCT methods can be found in: published US Patent application no.: 2012/0308371 A1; Tamaki Hideaki, Unno Masaru, Kawakubo Tomoki, Hirata Yukuta. *Aerodynamic Design of Centrifugal Compressor for AT14 Turbocharger*. IHI Engineering Review. Vol: 2 No. 2. 2010; and U.S. Pat. No. 6,945,748 B2.

The three main elements of SRCT referred to above essentially improve the compressor flow operating range by enhancing the surge characteristics of the centrifugal compressor. However, there are other means of tackling surge that do not involve making design changes to the compressor housing. Instead a recirculation kit/valve is used to recirculate compressed fluid back to the impeller inlet. These conventional compressor recirculation methods involve bleeding off fluid after the compressor outlet using a valve, typically actuated either pneumatically or electrically. These have been adopted by researchers to stabilise the flow in surge and, in certain scenarios, to aid other elements of the engine architecture such as exhaust gas recirculation (EGR). However, conventional recirculation is generally used as a transitional or temporary measure to avoid over-pressure and surge during tip-out conditions. Tip-out occurs when a large amplitude pressure wave is generated in the engine's intake piping, as in the event of the throttle closing. A pressure spike is caused by a column of air in the pipe decelerating suddenly due to sudden blockage at the throttle and the compressor not allowing pressure dispersion at the other end of the pipe. Without a compressor recirculation valve, the flow is subjected to reversal and inefficient or destructive dissipation of energy. This behaviour is cyclic and occurs at high frequencies, which also causes unacceptable noise levels (see, for example: Ali Ghanbanriannaeeni, Ghazalehsandat Ghazanfari Hashemi. *Protecting a Centrifugal Compressor from Surge*. Pipeline and Gas Journal. Vol. 240. No. 4. 2012; or What is the Recirculation Valve? [Online] Available from: http://www.turbomaster.info/eng/turbos/recirculation.php [Accessed Apr. 4, 2013].)

Another approach that has been used to tackle surge is the use of active or passive systems to modify the compressor's inlet pipe geometry, often called "pre-swirl devices". These achieve better part-load compressor performance and extend the operating range of a compressor by offsetting compressor "surge". However, this is usually at the cost of a reduced full-load performance. FIG. 1 illustrates the principle, showing a pair of compressor blades 10, which are aligned at an angle α to the (axial) direction of the incoming flow as shown by arrow A. The blades 10 are moving in the direction of arrow B. The resultant velocity of the air relative to the blades is shown by arrow C. Introducing a component of swirl to the flow, as shown by arrow D produces a resultant relative velocity shown by arrow E. If the angle of velocity E is equal to the angle of the blades, a, then the flow runs smoothly along the blades 10 and the compressor operates with maximum efficiency. Without swirl (relative velocity C), the flow separates from the backs of the blades 10. This causes the fluid to recirculate along the backs of the blades 10 to fill the low-pressure zones left behind by the flow separation. When this happens on a macroscopic scale, the compressor is experiencing surge.

Normal pre-swirl devices allow the surge margin to be improved by directing flow along the angle of the compressor blades. However, this is achieved at a cost of shifting the choke mass flow rate to a lower value. Several researchers have proposed various different pre-swirl configurations which involve the use of various blade or inlet guide vane (IGV) arrangements that may be fixed (i.e. stators) or adjusted (i.e. rotors). Hiroshi et al conducted a study looking at compressor map width enhancement (MWE) (15) using a synergistic approach of combining variable inlet-guide vanes and compressor casing treatment as shown in FIG. 1 (See: Hiroshi Uchida, Akinobo Kashimoto, Yuji Iwakiri.

*Development of a Wide Flow Range Compressor with Variable Inlet Guide Vane.* R&D Review of Toyota CRDL. Vol. 41. No. 3; and Map Width Enhancement (MWE) [Online] available from [accessed Aug. 29, 2013]: http://proceedings.asmedigitalcollection.asme.org/proceeding.aspx?articleid=1647215.

FIG. 2 shows the integration of a pre-swirl device, referred to as a variable inlet guide vane (VIGV) 20, in an inlet duct 22, with a SRCT 24 in a modified compressor casing 26, and an impeller 28. The results of a Computational Fluid Dymanics (CFD) simulation of this geometry are shown in FIG. 3, which shows both the efficiency (upper graph) and pressure ratio (lower graph) as a function of air flow rate for the conventional compressor, for the compressor with only the SRCT 22, and for the compressor with a VIGV angle of 70 degrees at a range of compressor speeds N of $0.38 N_0$, $0.63 N_0$, $0.88 N_0$ and $N_0$ the design speed. Also shown are "surge lines" for VIGV angles of 60 and 80 degrees. The surge lines are lines linking the points of minimum mass flow rate at which the pressure ratio can be achieved without surge. This may also be referred to as the surge margin for a particular compressor configuration. The results showed that installation of the SRCT alone resulted in an improvement of 30% of the surge margin relative to the conventional (i.e. unmodified) compressor at a pressure ratio of 2.5.

It can also be seen from FIG. 3 that the surge margin for the integrated configuration decreases as the VIGV angle increases. The authors claim that the surge margin flow rate can be reduced by 59% relative to the conventional compressor at a pressure ratio of 2.5 by changing the VIGV angle. Hiroshi et al also conducted an experimental study to investigate the benefits of the VIGV device alone (i.e. without any SRCT recirculation). The results showed that the reduction in surge margin was less than 15%. Thus, the authors suggested the synergistic configuration is more optimal to achieve a wide flow range centrifugal compressor. On the other hand, FIG. 3 also shows the penalty on the choke flow limit of the compressor (for the 70 degree VIGV) which is significantly reduced. This is the cost many pre-swirl devices incur in order to improve the surge flow margin of the centrifugal compressor. In terms of efficiency, as shown in FIG. 3 even though a slight improvement is seen in the compressor efficiency at low flow rates, the peak efficiency of the compressor is compromised by approximately 10%. This is due to the pressure losses that occur across the VIGV device as the vane angle increases at higher mass flow rates.

An IGV/VIGV improves stability at lower mass flow rates and reduces the volume of recirculating air required to achieve certain high-boost, low-flow operating conditions. However, the use of IGVs results in the compressor choking at higher engine speeds and causes a significant reduction of peak compressor efficiency.

Conventionally, compressors are coupled to a drive using a bolt which extends all the way through the hub. This leaves the end of the bolt exposed to the inlet fluid flow. As the end of the bolt will typically include a hexagonal head for tightening/releasing the bolt, this presents a surface which creates a drag on the incoming fluid and has an adverse effect on performance.

The present invention has been conceived with the aforementioned problems in mind.

SUMMARY

According to the present invention, there is provided a turbo-compressor comprising a compressor wheel having an attachment arrangement for attaching the wheel to a drive shaft, the attachment arrangement including an axially extending spigot internally radially located in a bore in the drive shaft and secured to the drive shaft by fastening means into the rear of the compressor wheel.

A fit between the spigot and the bore may have a closeness that increases with increasing speed of rotation of the compressor wheel. The compressor wheel may be formed of a material having a higher thermal expansion coefficient than the material of the drive shaft.

The front of the compressor wheel, which faces towards a flow of fluid to be compressed, may have an aerodynamically shaped profile.

The turbo-compressor may have an electrical drive, or an electrically-assisted drive. The turbo-compressor may further comprise a supplementary supply of energy for providing electricity to said electrical drive or said electrically assisted drive.

Embodiments may comprise: an inlet duct for receiving a flow of fluid to be compressed, an outlet through which compressed fluid is delivered, and means for allowing release of a portion of the compressed fluid from the outlet, wherein the means for allowing release is configured to operate at a part-load condition such that a higher volume flow of fluid than is required at the outlet is received at the inlet, thereby ensuring that the compressor operates without entering a surge condition.

The means for allowing release of a portion of the compressed fluid from the outlet may direct the released fluid back to the inlet of the compressor, or to a point upstream of the inlet. The released fluid may be directed back to enter the compressor at a location part-way through the compressor.

The turbo-compressor may further comprise a swirler for creating swirl in the compressed fluid that is directed back. The means for allowing release of a portion of the compressed fluid may comprise a valve. The valve may be actuated electrically, pneumatically or hydraulically.

Embodiments may make use of release and/or recirculation of compressed fluid taken from the outlet meaning that there is a higher flow of fluid into the inlet, thereby moving the operating point of the compressor towards a higher flow rate for a given pressure ratio at part-load conditions. This contrasts with prior art recirculation methods, which have been employed to reduce the pressure ratio at a given flow rate to avoid entering a surge condition during tip out—i.e. as a temporary, transient measure, rather than during steady-state part-load operation.

Embodiments may comprise: an inlet duct for receiving a flow of fluid to be compressed, an outlet through which compressed fluid is delivered, and means for creating swirl in a the fluid flow received at the inlet, said means interacting only with a portion of the fluid flow adjacent a wall of the inlet duct.

The means for creating swirl may comprise an active or passive, moving or static geometry that directs the fluid flow in the inlet duct to swirl in the direction of rotation of the compressor blades. Preferably the geometry only interacts with the portion of the fluid flow adjacent the wall of the inlet duct. The geometry preferably extends from the wall of the inlet duct to no more than 10%, and more preferably no more than 5%, of the radius of the duct.

The means for creating swirl may comprise one or more openings through which high pressure fluid is injected into the inlet duct to create swirl. The turbo-compressor may further comprise means for recirculating compressed fluid taken from the compressor outlet as the high pressure fluid injected into the inlet duct.

Embodiments may comprise: an inlet duct for receiving a flow of fluid to be compressed, an outlet duct through which compressed fluid is delivered, means for injecting fluid through a wall of the inlet duct so as to create swirl in a portion of the fluid flow adjacent the wall of the inlet duct.

The turbo-compressor may further comprise means for recirculating a portion of the compressed fluid from the outlet during operation at a part-load condition, wherein the means for injecting fluid injects the recirculated portion of compressed fluid.

In embodiments, the turbo-compressor may be comprised in a turbocharger, wherein the compressor is mechanically decoupled from a turbine of the turbocharger.

The compressor may be driven by an electric motor. Power may be supplied to the electric motor from a generator driven by the turbine, the control of the generator being adjustable in correspondence with a target exhaust gas pressure set by the demands of optimising compressor performance by injecting the exhaust gas into the compressor inlet.

The compressed fluid may be supplemented or replaced by fluid coming from elsewhere than the compressor's outlet. The compressed fluid may comprise engine exhaust gas.

Embodiments may combine and extend both the concepts of recirculation and swirl by injecting high-pressure, recirculated air in such a way as to impinge upon and adjust the compressor's inlet air flow, achieving similar results to a pre-swirl device (improved performance and the suppression of surge during conditions of low mass flow and high pressure rise). In addition, the means for creating swirl is only required to do so in the flow adjacent the wall of the inlet duct. It is not required to swirl the inlet flow across the whole of the duct. Therefore the pre-swirl device does not need to extend very far (if any distance at all) into the inlet duct. It will be appreciated that the flow adjacent the inlet duct wall, when it enters the compressor, is the flow that encounters the rotating blades at the position of highest blade velocity. Creating swirl in the flow at this location therefore has the greatest impact in reducing the effects of separation and flow reversal that cause surge. By not having any swirl device causing an obstruction to the majority of the inlet flow in the inlet duct, the effects on reducing pressure and loss of efficiency are minimised.

Moreover, as exemplified the Applicant's published patent applications Nos: EP 2,586,124 and EP 2,102,469, recent developments in electrically driven compressors have led to a unique excess of available energy at part load, especially in configurations where the turbine and compressor are decoupled from each other and the compressor is driven by an electric motor. Electric motors have a wide range of achievable torque levels. In the case of electric motors designed to drive turbo-compressors, these produce a wide range of torque levels over a wide range of speeds. This provides a unique opportunity to benefit from improvements to compressor design that provide for a very wide compressor operating range. With these developments and improvements, one turbo-compressor could provide the full boosted inlet air requirement of a heavily downsized and pressure charged engine that would normally require two or more compressors (because of the restricted operating range of conventional turbo-compressors).

These developments have introduced a control regime in which that excess energy can be used for recirculation in cases where the air flow requirement of the engine is too small to allow the compressor to operate at the target outlet pressure without entering surge. Since recirculation of compressed gas is now available at part load, it can be used as a tool to impinge upon inlet air flow and achieve a "pre-swirl" effect. Furthermore, embodiments to be described below achieve part-load, pre-swirling, recirculating flow with a surprisingly high efficiency by directing the recirculating flow to the compressor's blade tips rather than uniformly over the blade length.

Embodiments may include a swirl generating device for use with a turbo-compressor and configured to introduce a high-pressure fluid at or upstream of the inlet of the compressor and to create a swirling motion into low-pressure fluid entering the compressor. The swirl generating device may be configured to inject the high pressure fluid at a point of injection inside the compressor part way along an impeller blade.

Embodiments of the invention may include a means of combining the recirculating air taken from the compressor's outlet with other high-pressure gasses such as engine exhaust gas. This could be useful in an engine using Exhaust Gas Recirculation, where exhaust gas could become mixed into the compressor's outlet flow at the engine's intake manifold, or else the recirculation device itself could be the mechanism or part of the mechanism to provide for the injection of exhaust gas into the engine's inlet.

Embodiments of the invention may further comprise means for cooling the released portion of the compressed fluid before it is directed back to the compressor. Recirculating air could be disadvantageously hot for a number of reasons, including (1) that the compressor's inefficiency could heat the air or (2) that the recirculating air could be combined with hotter gasses such as gasses from the exhaust manifold of an engine. Cooling would restrict the energy available in the recirculating flow to entrain swirl in the compressor inlet, but it could be a necessary precaution to avoid overheating the compressor or else an advantageous feature to maintain a lower engine inlet manifold temperature.

Embodiments of the present invention may be combined with elements of the Applicant's as-yet un-published patent application No. GB1304763.4 entitled Turbine and a Controller Thereof. This describes a turbine for extracting energy from a fluid flow and a controller. The controller calculates an optimum operating velocity of the rotational output of the turbine based on the operating conditions and provides a signal to a variable load to adjust the load applied to the rotational output so that the turbine operates at the optimum velocity. Accordingly, it will be apparent that the optimisation of compressor performance could become a controller setpoint or target used for a turbine speed controller in a configuration having an electric generator attached to a turbine and a means of recirculating gasses from the turbine's intake manifold (engine's exhaust manifold) to the compressor's inlet. The turbine's generator torque could be controlled in such a way, for example, as to influence the engine's exhaust manifold pressure and thereby the quantity or the enthalpy of recirculating gasses to be injected at the compressor's inlet.

It is also possible that the compressor's inlet duct is arranged in such a way that it produces an unwelcome swirl at the compressor inlet, either of the wrong magnitude or in the wrong direction to provide for maximum compressor efficiency. A common example is that a bend may be placed in the pipe just a short distance upstream of the compressor. The bend in the pipe will generally introduce a swirl. It will be apparent that the swirling and recirculating methods described here could be used to correct for this type of unwelcome swirl just as they can be used to introduce swirl into a non-swirling inlet flow.

DETAILED DESCRIPTION OF EMBODIMENTS

Embodiments are described below in connection with a particular turbocharger turbo-compressor application. However it will be appreciated that many of the principles relate to specific aspects of the turbo-compressor, and may be applied to any turbo-compressor application.

Figure 16:
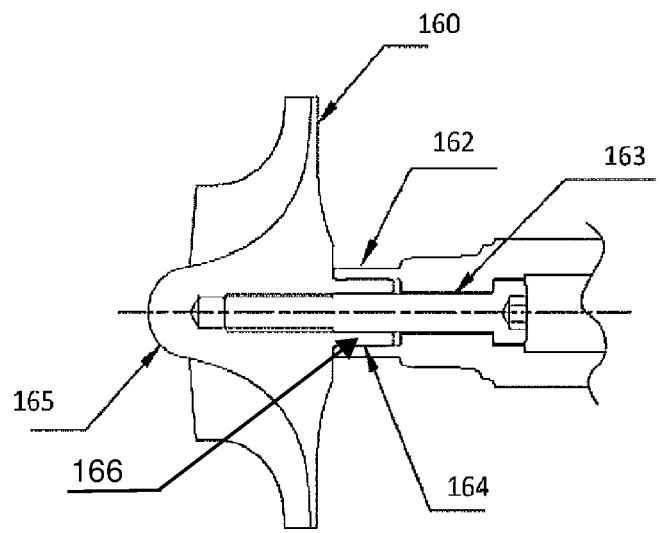
FIG. 16 is another diagram illustrating a cross-sectional elevation of part of a turbo-compressor.

FIG. 16 shows an arrangement for attaching a radial compressor wheel 160 to a drive shaft 162. The compressor wheel 160 has an axially extending spigot 166, which is internally radially located in a bore 164 in the shaft 162 and is secured to the shaft using a bolt 163, or similar fastening means, into the rear of the compressor wheel 160. The radial location is designed such that when the compressor wheel, which has a larger outside diameter, is rotating, its moment of inertia acts to expand the compressor location spigot 166 to a degree that ensures contact with the bore 164 at all speeds eliminating rotating imbalance due to additional radial offset of rotating parts. The location arrangement may be designed such that the closeness of the "fit" between the locating parts increases with speed and thus allows greater machining tolerances and a potentially easier fitting process. Moreover, the effect could also take advantage of differential thermal expansion at the operating temperature of the assembly if the compressor wheel material has a higher thermal expansion coefficient than the shaft (e.g. aluminium compressor and steel shaft).

The front of the compressor wheel 160 faces towards the inlet flow of fluid into the compressor and has an aerodynamic profile 165. Conventionally, compressors are coupled to a drive using a bolt which extends all the way through the hub. This leaves the end of the bolt exposed to the inlet fluid flow. As the end of the bolt will typically include a hexagonal head for tightening/releasing the bolt, this presents a surface which creates a drag on the incoming fluid and has an adverse effect on performance. By coupling the compressor wheel 160 to the drive shaft 162 only through the rear, the compressor wheel can be provided with an aerodynamic shape to reduce the drag.

Advantages include:—
- A potentially "stiffer" shaft design allowing higher lateral bending critical speeds;
- A lower over-hung mass on the shaft allowing higher lateral bending critical speeds;
- Allowing the compressor to be run at higher speeds while remaining below lateral critical bending speeds;
- Less critical balancing requirements;
- Improved rotordynamic response;
- Possibility of eliminating the need for "assembly balancing" following compressor/shaft assembly;
- Potentially easier fitting and dismantling processes;
- Front of compressor wheel can be profiled to improve flow into compressor and improve efficiency Turbo-compressors that include this compressor wheel attachment arrangement are particularly suitable for use where the compressor has an electrically powered drive, or where the compressor drive may be assisted by an electrical drive. For example, some turbo-compressors are designed such that the compressor is driven mechanically (e.g from en engine exhaust gases driving the turbo) under certain conditions, or by means of an electric motor in other conditions. In some cases the turbo-compressor may also act as a generator that generates electricity, which is then stored (e.g. in capacitors, accumulators or a battery). Alternatively, electrical energy may be generated by other means, or from other parts of a system. This electrical energy can then be used to power the electric drive of the compressor, when required. The drive shafts of electrically driven, or electrically assisted compressors are generally significantly larger in diameter than a conventional turbocharger shaft, and so there is more space to accommodate a bolt through the centre of the shaft.

As mentioned previously, engineers are faced with the challenge of improving the low-end torque response in a downsized engine application due to the restriction imposed by the flow range of the centrifugal compressor (i.e. surge and choke). Therefore, twin-stage turbo/auxiliary supercharger configurations are employed to provide turbocharging boosting. This enables the boosting configuration to be matched accordingly to the engine load demand. However, this requires extra ducting, hardware and has a higher degree of packaging difficulty.

Figure 1:
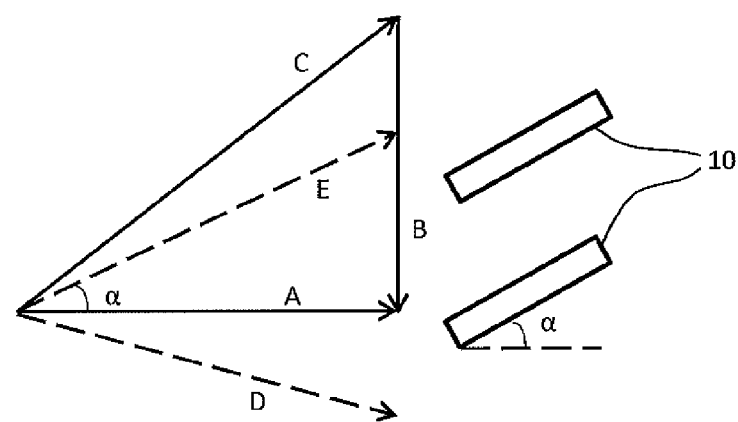
FIG. 1 is a diagram illustrating a swirl effect in a turbo-compressor.
Figure 2:
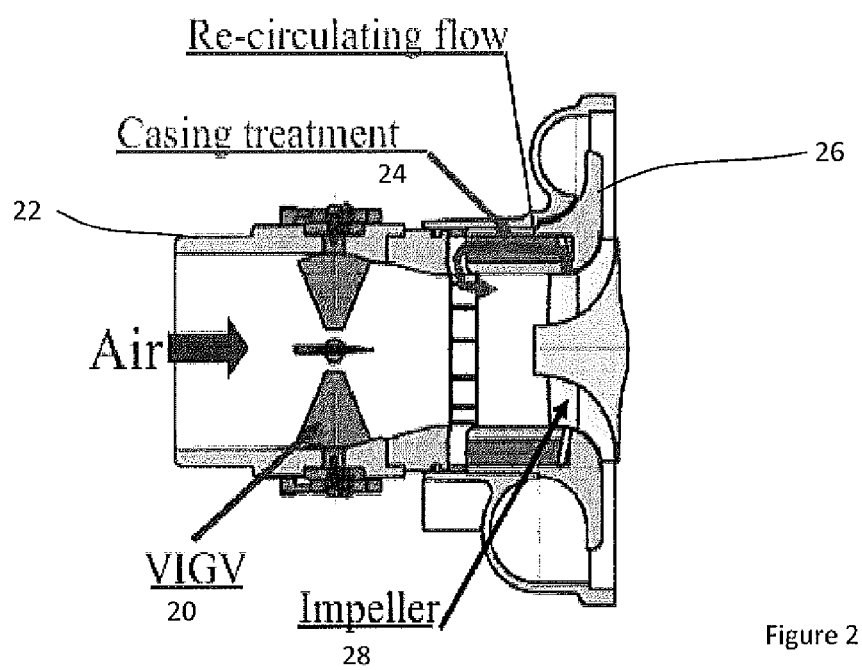
FIG. 2 is a sectional illustration of a known turbo-compressor arrangement.
Figure 3:
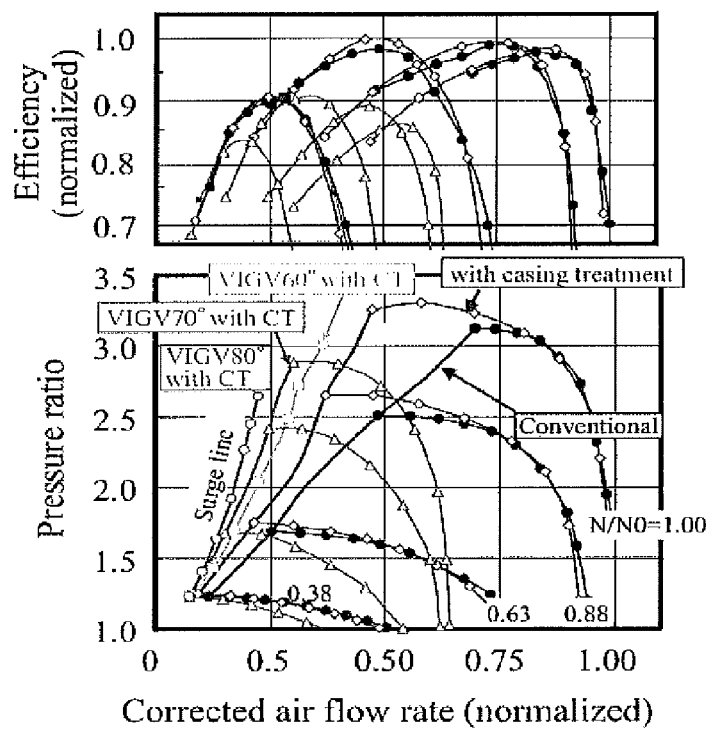
FIG. 3 is a graph showing results of CFD simulations of the turbo-compressor arrangement of FIG. 2.
Figure 4:
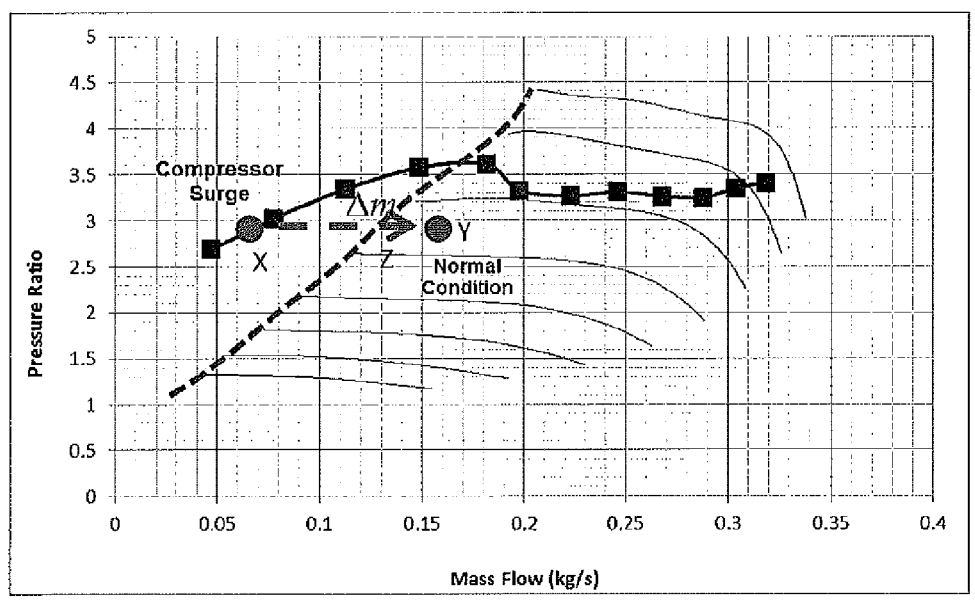
FIG. 4 is a graph of pressure ration against mass flow rate for a turbo-compressor, illustrating a principle on which embodiments of the invention are based.

FIG. 4 illustrates graphically one of the principles utilised in embodiments of the invention. FIG. 4 is graph of compressor pressure ratio against mass flow. The line connecting square points on the graph represents the boost pressure required in a heavily downsized engine application in order to meet the target engine performance. The dashed red line is the surge line representing the boundary between normal operating conditions and the onset of a compressor surge condition. It can be seen that at the low-engine speeds (i.e. low mass flow rates) the compressor surges. This problem can be solved by having a second auxiliary supercharger configuration as a low power-assisted device. However, the alternative solutions presented here allow the engine performance to be achieved using a single-stage turbo-compressor.

In FIG. 4, a point X is shown on the required pressure ratio line in the surge condition. As indicated by the arrow Z, if the point X is moved to the right (higher mass flow, same pressure ratio) to point Y, the surge condition can be avoided. This can be achieved by operating the compressor at a higher mass flow than required, and releasing some of the compressed fluid from the outlet. In this case a device, such as a valve, is provided near the compressor outlet, and which can be opened to allow release of a portion of the compressed fluid from the outlet during operation at a part-load condition. Thus, a higher volume flow of fluid than is required at the outlet is received at the inlet, thereby ensuring that the compressor operates away from the surge condition.

Figure 5A:
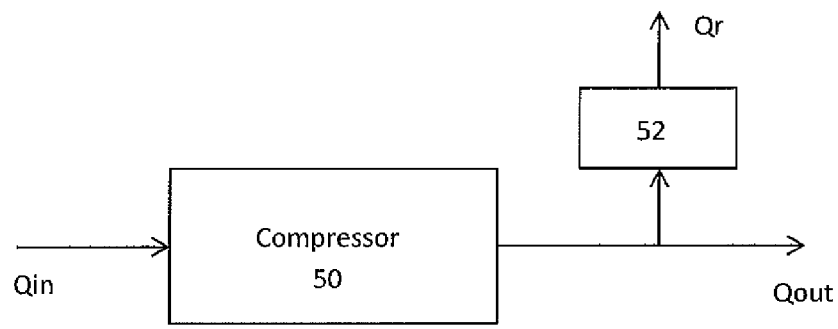
FIGS. 5a and 5b are schematic block diagrams of embodiments of a turbo-compressor according to one aspect of the invention.
Figure 5B:
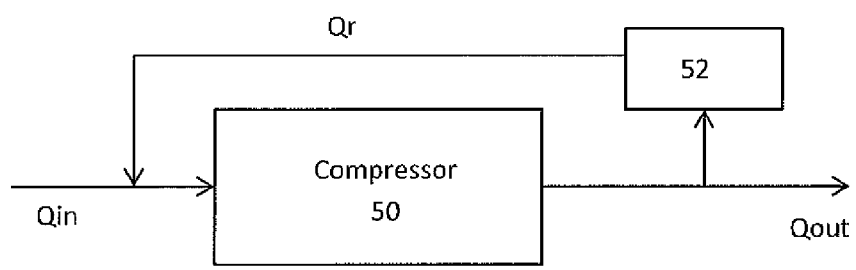

However, rather than simply discarding the released compressed fluid, this may be recirculated back to the inlet. These two operating modes are illustrated schematically by way of a block diagram in FIGS. 5a and 5b. In FIG. 5a, a mass flow Qin enters the inlet of compressor 50 and a mass flow Qout exits the compressor 50. A device 52 releases a portion Qr of the outlet flow. In FIG. 5b, the device 52 releases the portion Qr and returns it to the inlet of compressor 50. In the mode of FIG. 5b Qout is less than Qin, while in the mode of FIG. 5n Qout is equal to Qin. In the mode illustrated in FIG. 5b, recirculation on its own moves the effective operating point to the right (as shown in FIG. 4) by allowing the compressor to pump more air than is demanded. The background discussion above has highlighted some of the current applications of compressor recirculation adopted in the industry. However, compressor recirculation to avoid surge in part-load operation has not been proposed. The embodiments presented here allow a heavily downsized engine to produce full torque across a broad range of air flow rates using a single-stage decoupled turbo with compressor recirculation. The compressor recirculation principle practically achieves the full-load condition without compressor surging. It involves bleeding off mass ($\Delta$m) required to avoid surge from the compressor exit and recirculating it back to the inlet of the compressor. This essentially compensates for the mass flow rate at the impeller inlet and avoids the compressor from surging.

However, compressor recirculation comes at a cost of extra compressor power as the load on the compressor is increased. Equation (i) below shows the power relationship required by the compressor.

$$P_{Recirculation} = \dot{m}_{Recirculate} \times C_P \times T_{in} \times \frac{[(PR)^{0.2857} - 1]}{\eta_{compressor}} \qquad \text{Eqn (i)}$$

where $P_{Recirculation}$ is the power, $\dot{m}_{Recirculate}$ is the recirculated mass flow rate, $C_P$ is the specific heat capacity at constant pressure of the fluid being compressed, $T_{in}$ is the absolute temperature of the fluid, PR is the pressure ratio, and $\eta_{compressor}$ is the compressor isentropic efficiency.

Equation (i) shows that the greater the amount of recirculated mass flow rate, the higher the recirculation power required by the compressor. As discussed previously, there are various methods that allow surge margin of the centrifugal compressor to be enhanced. However, these methods are complex and require changes to the compressor housing.

As discussed in the background above, introducing a pre-swirl device such as fixed or variable inlet-guide vanes (IGV) upstream of the compressor inlet helps shift the surge line to the left. However, a problem with known pre-swirl devices is that although they can help prevent surge at part-load, the devices substantially reduce the choke limit at higher load conditions, and reduce the efficiency across a range of conditions.

Figure 6:
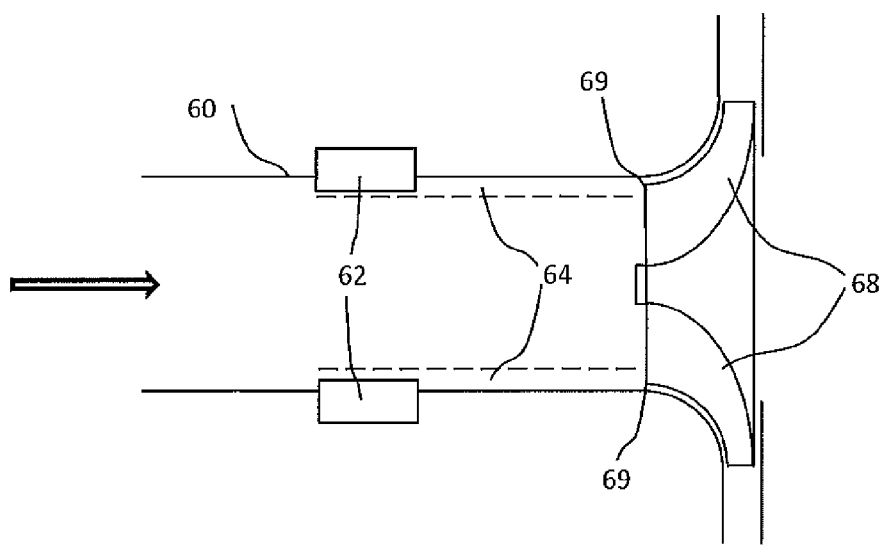
FIG. 6 is a diagram illustrating a cross-sectional elevation of part of a turbo-compressor.

FIG. 6 illustrates a principle on which pre-swirl is introduced into a turbo-compressor inlet flow in accordance with embodiments described herein. As shown in FIG. 6, an inlet duct 60 of a turbo-compressor receives a flow of fluid to be compressed. At, or close to the wall of the inlet duct 60 is a pre-swirl device 62 for creating swirl in a portion 64 of the inlet fluid flow adjacent to a wall 66 of the inlet duct 60. Also shown in FIG. 6 are the compressor blades 68, having outer tips 69. Any of a variety of devices, examples of which will be described in the embodiments below, may be used for the pre-swirl device 62. Accordingly, the pre-swirl device 62 may be any means for creating swirl in the flow 64 adjacent the wall 66 of the inlet duct 60. It is not required for the pre-swirl device 62 to extend across the whole cross-section of the duct 60. The pre-swirl device 62 does not need to extend very far (if any distance at all) into the inlet duct 60. The flow portion 64 adjacent the inlet duct wall 66, encounters the rotating compressor blades 68 at, or close to, the tips 89, where the blades 68 have their highest velocity. Creating swirl in the flow at this location therefore has the greatest impact in reducing the effects of separation and flow reversal that cause surge. By not having any swirl device causing an obstruction to the majority of the inlet flow in the inlet duct, the effects on reducing pressure and loss of efficiency are minimised.

The concept described above and illustrated in FIG. 6, may be combines with the recirculation concept, as described in relation to FIGS. 4 and 5b. In this way, the pre-swirl device 62 is used to shift the surge margin to the left (in FIG. 4) and thereby reduce the amount of power required to recirculate the required flow rate to avoid surge.

Figure 7:
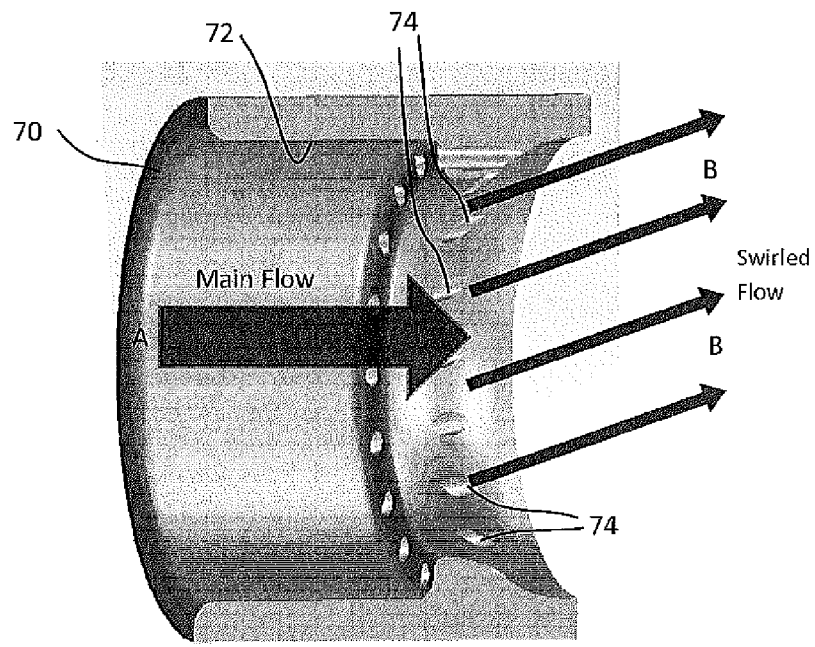
FIG. 7 is an isometric 3-dimensional view of a cross-sectional elevation of a model of an inlet duct.

This concept can be extended to make use of the recirculated fluid from the compressor outlet, to create the swirl by injecting the recirculated fluid through the inlet duct wall at an angle. A CFD simulation model of this concept is depicted in FIG. 7. FIG. 7 shows an isometric 3-dimensional view of a cross-sectional elevation of an inlet duct 70, having an inner wall 72. The main inlet flow is in the direction of arrow A. An array of nozzles 74 is formed in an inwardly-extending flange portion 76 of the duct 70. The nozzles 70 are positioned evenly around the circumference of the inlet duct 70 and are aligned at an angle to the axis of the duct 70 such that jets of fluid are formed in the direction of the arrows B to impart a swirling motion in the flow in the region adjacent to the duct wall.

Figure 8:
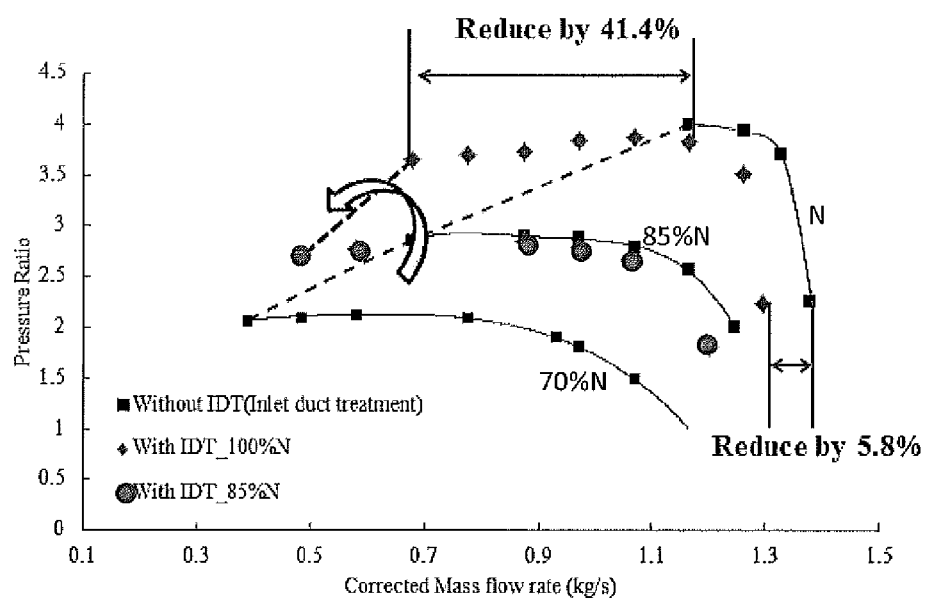
FIGS. 8 and 9 are graphs displaying results of CFD simulations carried out on a model incorporating the inlet duct of FIG. 7.

An initial simulation was conducted to test the influence of impinging, high-pressure recirculating air provided through the nozzles 74. The simulation was based on an existing centrifugal compressor wheel. Experimental data for the surge and choke characteristic for this wheel (without any swirl) was available. The simulation investigated the choke and surge behaviour of the compressor wheel and compared it against experimental data. Once the model was validated, a simulation was performed with the swirling recirculating air flow, the surge and choke limits of the compressor were re-assessed, together with compressor efficiency, and compared to the validated baseline data. FIG. 8 is a graph showing a comparison of the CFD simulation results with and without recirculation. The graph lines linking the square points are from the initial simulation without any inlet duct treatment (i.e. no recirculation or swirl), at three speeds—design speed N, 85% N and 70% N. The dashed line linking the ends of these represents the surge margin. Also shown are points from the simulation results with the inlet duct treatment for speeds of N (diamond-shapes) and 85% N (circles). A short dashed line linking the end points indicates the surge margin for this configuration It can be observed from FIG. 8 that the surge mass flow rate is significantly reduced using the recirculating swirl configuration. Especially at the design speed (N), the surge mass flow rate is reduced by 41.4%. The choke mass flow also reduces when swirling recirculation is employed. However, the shift in choke flow mass flow rate is only by 5.8% which is a small proportion compared with the gain in surge margin achieved and is much less than the reduction that occurred with the prior art pre-swirl devices described in the background section above.

Figure 9:
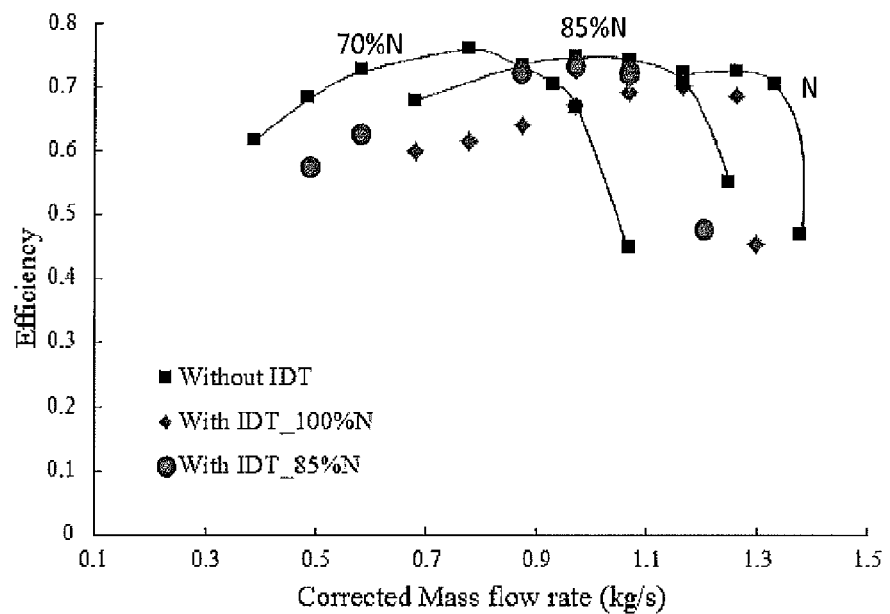

Despite improvements to the operating range of the compressor (range of mass flow rates), inefficiencies in the recirculation system lead to a pressure ratio drop of about 4.3% at the design speed. This drawback is considered to be affordable given the gain in surge margin. It is less than with conventional pre-swirl devices, and the gain in surge margin with use of recirculation is much greater. The reduction is less at lower speeds, as shown in FIG. 8. FIG. 9 is graph of the compressor efficiencies for the same results and shows that the peak efficiency of the compressor is reduced by about 0.02 when swirling recirculation is used. Further aerodynamic optimisation could lead to higher efficiency.

From the CFD simulation results, swirling recirculation can extend the surge margin effectively to reduce the amount of recirculated mass flow rate required without penalising peak compressor efficiency and choke limit too heavily. An electrically driven compressor with swirling recirculation is a solution that will allow the full-load performance of a heavily downsized engine performance to be satisfied.

Recirculating air can be injected into the low-pressure pipe leading to a compressor wheel via a number of alternative geometric configurations. For reasons of efficiency, discussed above, the most appealing configurations are those which inject the recirculating air near the wall, and those methods are the focus of the present discussion.

Figure 10:
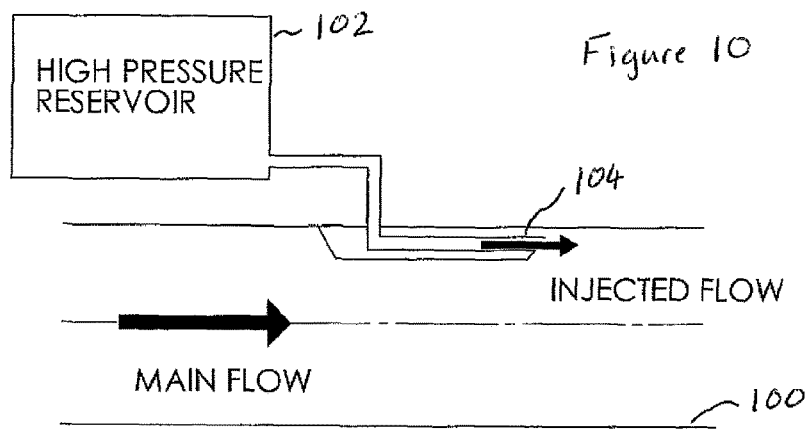
FIGS. 10 to 15 are diagrams illustrating embodiments of swirler arrangements.

In one embodiment, as shown in FIG. 10, high pressure air recirculated from the compressor outlet makes its way into a compressor inlet duct pipe 100 via an annular chamber 102 arranged around the pipe 100. From the annular chamber 102, the high pressure air passes through a set of holes or nozzles 104 positioned around the inner circumference of the inlet pipe 100. The holes 104 can be arranged in such a way as to dictate the direction of flow of the high pressure air. The holes 104 direct the air with a swirl, in accordance with the simulation described above in connection with FIGS. 7 to 9. The holes 104 could also introduce a component of velocity towards the centre of the pipe or towards the wall. Some or all of the holes could even face in the reverse direction, contrary to main flow.

Figure 11:
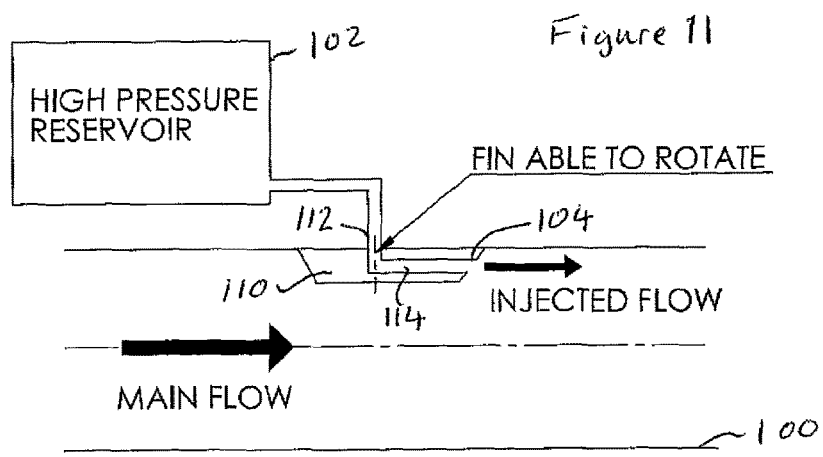

FIG. 11 shows a similar arrangement to FIG. 10, where equivalent features have the same reference numerals, and in which the holes are positioned in movable fins or injectors 110 such that the orientation of the holes 104, and thus the angle of injection of the air, can be adjusted depending on the operating condition of the compressor. This can provide improved efficiency over a wide range of compressor operating conditions, because the degree of swirl is directly controllable to reflect the angular velocity of the compressor blades. Air enters into the rotatable fin or injector 110 by means of a hinge 112 with a hole down the centre, conveying the air into a small chamber 114 within the fin or injector 110, from which the recirculating air can pass through a further hole 116 at the tip of the fin or along the fin to join the main flow. In addition to directing the angle of the high pressure air being injected into the inlet pipe 100, the fins or injectors 110 may also have some direct impact on the angle of the main flow, by interacting with the main flow near the wall of the pipe, either upstream or downstream of the point of injection of recirculating air.

Figure 12:
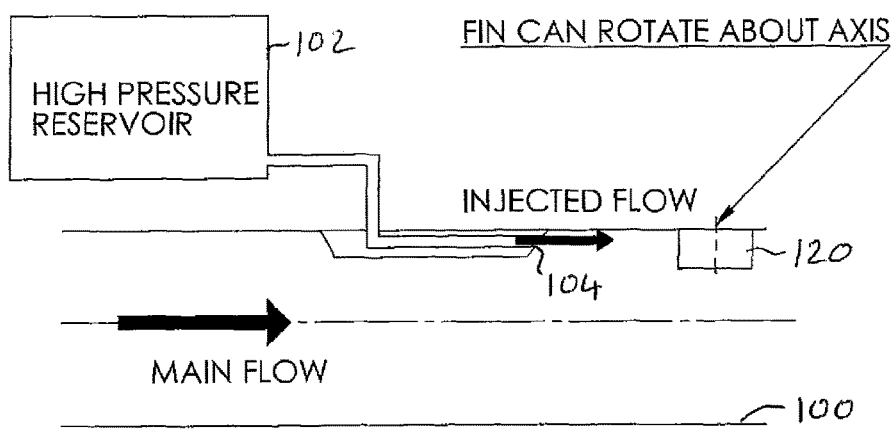

Alternatively, as shown in FIG. 12, where equivalent features have the same reference numerals as used in FIG. 10, the holes 104 to inject recirculating air are static, as described previously, but in this embodiment small guide vanes 120, optionally rotatable for adjustment of vane angle, are positioned downstream of the injector holes. These vanes 120 have a primary function of directing the angle of the high pressure air coming from the injection points of holes 104, but they may also serve a secondary function of interacting with the main flow, depending on the size of the vanes 120 used and the distance between the vanes 120 and the point of injection of high pressure air.

Figure 13:
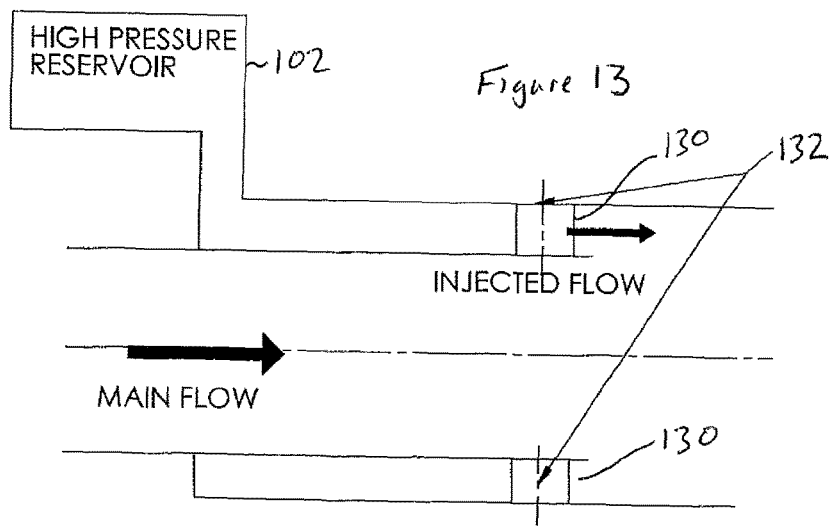

The annular cavity 102 described above could be connected to the main compressor inlet pipe not through holes but through as simple annular opening 130, as shown in FIG. 13, where equivalent features have the same reference numerals as used in FIG. 10. High pressure air travels through the annular opening 130 to join the main flow at or near the wall of the main inlet pipe 100. At the opening 130, vanes 132 are positioned to impart a swirl into the high pressure air as it is injected into the main flow. The vanes 132 may include a facility to be rotated, to adjust the angle of swirl depending on the operating condition of the compressor.

Figure 14:
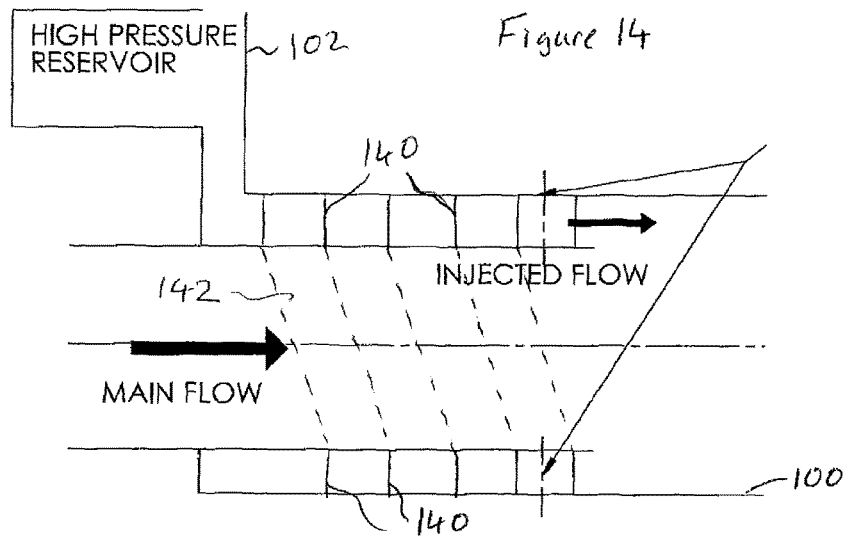

FIG. 14 shows another embodiment, similar to FIG. 13 and in which equivalent features have the same reference numerals. In FIG. 14, spiral separating walls 140 are placed inside the annular space through which the high pressure air passes before it enters the main flow. Thus, the high pressure air passes along a spiral channel, or channels 142, which provides an angular component to the air.

Figure 15:
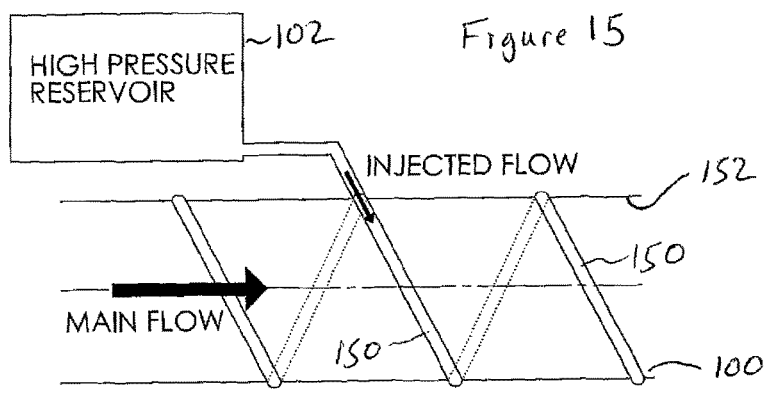

In another embodiment, as shown in FIG. 15, the inlet pipe 100 is provided with helical grooves 150 formed in the inner surface 152. High pressure air is injected along the grooves 150, to entrain the main air into a swirling flow.

All of the above embodiments for injecting air up-stream of a compressor wheel may be adapted to inject air precisely at the entrance to the compressor wheel or impeller, or even after the entrance. For example, angled holes in the compressor housing could inject air part-way along the length compressor blades, where the surrounding (non-recirculating) air is already partially compressed, having travelled some way through the compressor.

Diffuser vanes are a well-known compressor design feature. Diffuser vanes guide the outlet air from a compressor wheel with the objective of directing the flow through the compressor volute with greater efficiency and enabling a more efficient transition from kinetic energy to static pressure potential energy within the working fluid. High-pressure recirculating air could be injected into the diffuser region, after the compressor wheel, to improve overall compressor efficiency. The actual mechanism for injecting the air could resemble or be adapted from any of the aforementioned mechanisms. It is recognised that the high-pressure recirculating air will need to be extracted from a low-velocity point in the high-pressure system, such as the intake manifold, so that its static pressure will be higher, than the static pressure at the injection point. With a correctly designed injection geometry, it will be possible to have the recirculating air entrain into the main compressor outlet air, while also imparting a component of velocity in the swirl direction, or whatever direction is found through simulation to be most advantageous to the efficient transmission of the fluid from the compressor wheel outlet and from a high-velocity state to a high-static-pressure state.

It will be recognised that the concepts and designs disclosed herein could as well apply to any centrifugal or axial turbo-compressors designed to pump or compress either air or other working fluids, either in engine applications or other applications.

The pre-swirling recirculation described above is relatively easy to implement, and a bespoke valve to control the recirculating flow can respond to a controller that is calibrated to avoid surge based on a-priori knowledge of the surge line of the centrifugal compressor or based on pressure sensor(s) in or after the compressor. The valve can be a simple orifice/throttle device which controls the amount of recirculated mass flow rate. This can be actuated electrically using an electrical solenoid or by pneumatic means. In addition, the system allows surge to be avoided under full-load conditions as well as any other operating condition that could place a compressor in surge, for example in situations where the compressor is not able to meet the normal steady-state air demand of an engine without entering surge. By contrast, other means of compressor recirculation solely focus on avoiding over-boost (especially during full-load and tip-out conditions).

While conventional turbochargers are often at risk of over-boosting (as indeed they are at risk of lagging) because the turbine power does not match the compressor's power requirement (and in the case of overboosting, the turbine is providing too much power to the compressor), Applicant's electrically driven compressors are not susceptible to that problem, because the electric energy used to drive the compressor is always under electronic control. When comparing the present invention to conventional recirculation, the motive behind the present invention is to extend the operating envelope of the compressor, at the cost of more input power required from the electric motor driving the compressor, not to waste excessive input power available from a turbine. When comparing the present invention to conventional pre-swirl devices, the present invention can make use of a readily available supply of high-pressure air from the compressor's outlet to complement or replace the conventional geometry used to introduce pre-swirl. An excess of high-pressure air can be made available by directing more power to an electric motor driving the compressor.

Conventional compressor recirculation tends to compromise the peak efficiency of the compressor heavily. However, using an optimised swirling recirculating device allows the surge margin to be reduced without compromising the peak efficiency of the compressor too heavily. This is because the flow is redirected at the tip of the compressor inlet in a controlled fashion. Furthermore, this recirculation strategy allows the injection of the mass flow rate to be done in a controlled manner instead of relying on the flow dynamics to recirculate the mass flow rate. A geometry for injecting swirling high-pressure air into the compressor inlet is generally less bulky and less intrusive upon the main flow than a geometry for introducing pre-swirl by direct interaction with the main flow. The less intrusive nature of this geometry is another reason why the negative impact of the present invention on compressor efficiency when not in use (in high-pressure, high-flow conditions) is less than the impact of conventional pre-swirl devices.

The invention claimed is:

1. A turbo-compressor comprising:
a compressor wheel having an attachment arrangement for attaching the wheel to a drive shaft, the attachment arrangement including an axially extending spigot internally radially located in a bore in the drive shaft and secured to the drive shaft by fastening means into the rear of the compressor wheel, the turbo-compressor;
an inlet duct for receiving a flow of fluid to be compressed,
an outlet through which compressed fluid is delivered, and
means for allowing release of a portion of the compressed fluid from the outlet,
wherein the means for allowing release is configured to operate at a part-load condition such that a higher volume flow of fluid than is required at the outlet is received at the inlet, thereby ensuring that the compressor operates without entering a surge condition and allows release of a portion of the compressed fluid from the outlet to direct the released fluid back to the inlet of the compressor, or to a point upstream of the inlet,
the turbo-compressor further comprising a swirler for creating swirl in the compressed fluid that is directed back to the inlet of the compressor.

2. The turbo-compressor according to claim 1, wherein a fit between the spigot and the bore has a closeness that increases with increasing speed of rotation of the compressor wheel.

3. The turbo-compressor according to claim 1, wherein the compressor wheel is formed of a material having a higher thermal expansion coefficient than the material of the drive shaft.

4. The turbo-compressor according to claim 1, wherein the front of the compressor wheel faces towards a flow gas to be compressed and has an aerodynamically shaped profile.

5. The turbo-compressor according to claim 1, wherein the compressor has an electrical drive or electrically assisted drive.

6. The turbo-compressor according to claim 5, further comprising a supplementary supply of energy for providing electricity to said electrical drive or said electrically assisted drive.

7. The turbo-compressor according to claim 1 wherein the means for allowing release of a portion of the compressed fluid comprises a valve.

8. The turbo-compressor according to claim 1, wherein the swirler comprises an active or passive, moving or static geometry that directs the fluid flow in the inlet duct to swirl in a direction of rotation of compressor blades of the turbo-compressor.

9. The turbo-compressor according to 8, wherein the geometry only interacts with the portion of the fluid flow adjacent the wall of the inlet duct.

10. The turbo-compressor according to claim 9, wherein the geometry extends from the wall of the inlet duct to no more than 10%, and preferably no more than 5%, of the radius of the duct.

11. The turbo-compressor according to claim 1, comprised in a turbocharger, wherein the compressor is mechanically decoupled from a turbine of the turbocharger.

12. The turbo-compressor according to claim 11, wherein the compressor is driven by an electric motor.

13. The turbo-compressor according to claim 12, wherein power is supplied to the electric motor from a generator driven by the turbine, the control of the generator being adjustable in correspondence with a target exhaust gas pressure set by the demands of optimising compressor performance by injecting the exhaust gas to the compressor inlet.

* * * * *